Jan. 20, 1970    D. J. MAST ET AL    3,490,617
BOTTOM UNLOADER FOR SILOS
Filed May 2, 1967    3 Sheets-Sheet 1
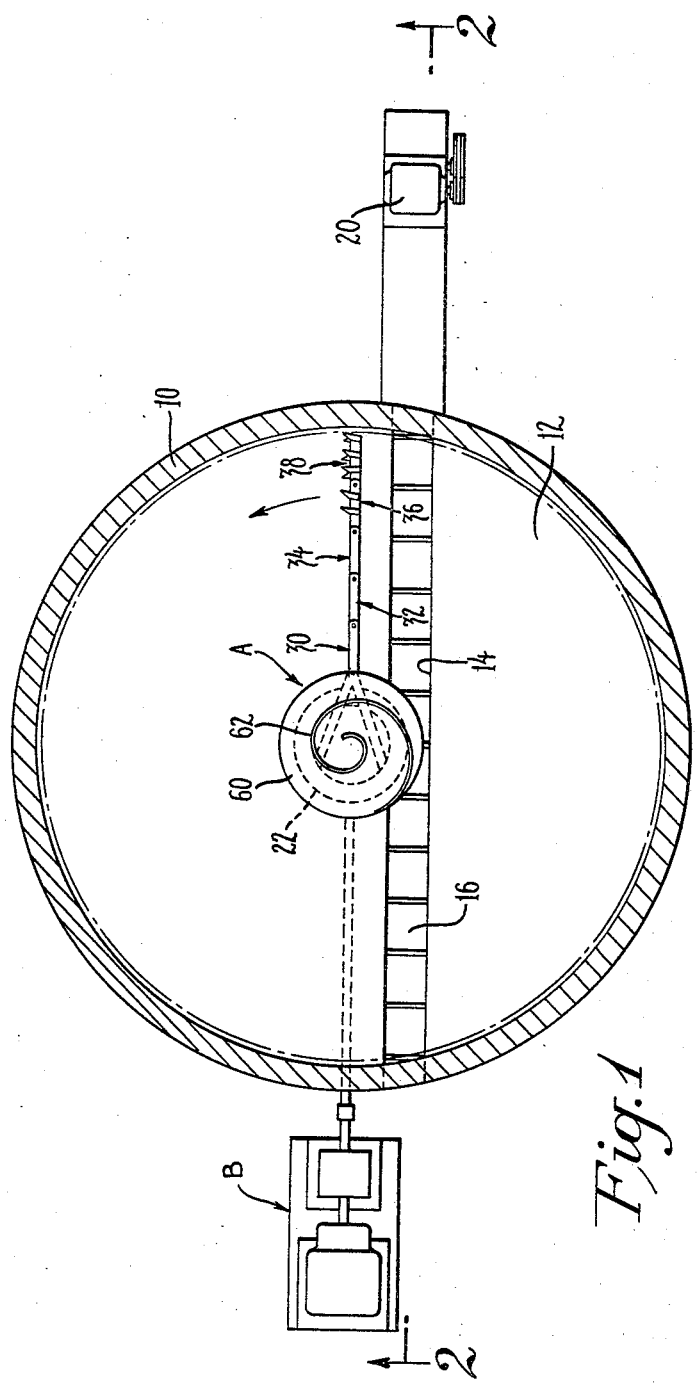
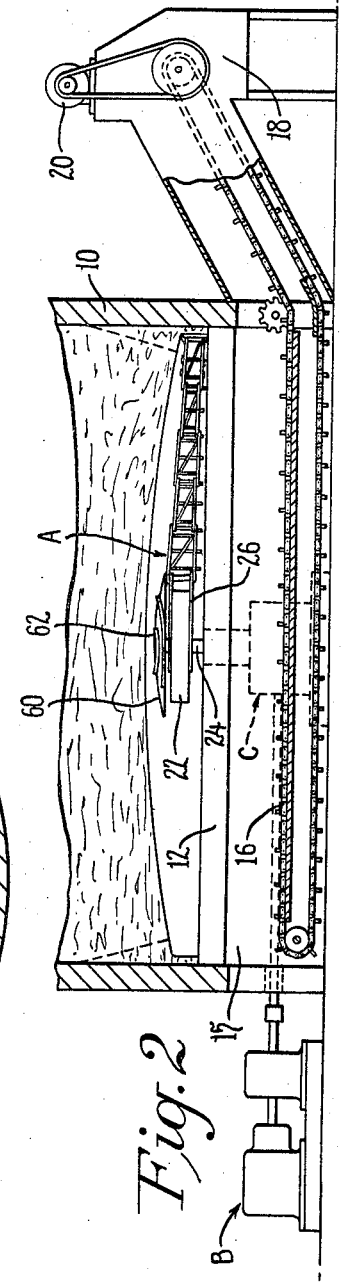
INVENTORS.
DEAN J. MAST
JONAH W. MAST
HARVEY J. MAST
BY Tweedale & Gerhardt
ATTORNEYS.

Jan. 20, 1970  D. J. MAST ET AL  3,490,617
BOTTOM UNLOADER FOR SILOS

Filed May 2, 1967  3 Sheets-Sheet 3

INVENTORS
DEAN J. MAST
JONAH W. MAST
BY HARVEY J. MAST

Tweedale & Gerhardt
ATTORNEYS.

United States Patent Office 3,490,617
Patented Jan. 20, 1970

3,490,617
BOTTOM UNLOADER FOR SILOS
Dean J. Mast, Jonah W. Mast, and Harvey J. Mast,
Amelia, Va., assignors to Badger Northland Inc.,
Kaukauna, Wis.
Filed May 2, 1967, Ser. No. 635,487
Int. Cl. B65g 65/30; G01f 11/20
U.S. Cl. 214—17                                          6 Claims

ABSTRACT OF THE DISCLOSURE

An improved silo unloader for unloading silos from the bottom consisting of a rotating flail-like member including a plurality of rigid radially extending pivotally connected portions, the outer portion acting to cut into silage with all of the portions acting to sweep loose silage into a conveyor which moves the silage to a point outside the silo.

This invention relates to the silo unloader shown in the application of Dean J. Mast, S.N. 510,919, filed Dec. 1, 1965 and now Patent No. 3,394,824. The present invention includes several improvements and features on the silo unloader shown in the above Mast application, which improvements individually and collectively increase the efficiency of the silo unloader as well as permit it to be used in a wider variety of conditions.

Briefly, the invention includes providing a power driven rotary structure which is centrally located in the bottom of a silo and which has a collapsible flail structure comprising a plurality of pivotally connected rigid sections which, when radially extended by centrifugal force reaches almost to the outer wall of the silo. Teeth are provided on the outer sections of the flail structure which cut into silage above, below and outwardly of the flail. The flail structure initially wraps around a central driving and supporting wheel underneath a hood portion secured to rotate with the wheel and which prevents the silage from falling directly on the flail structure when in its wrapped condition. A helical or screw-like flight formed on the top of the hood aids in permitting the hood and the flail structure to rotate even when silage is directly on top of the hood. A further feature is the provision of an inclined pivot connection of the innermost flail section to the central driving wheel portion, so as to provide a self-wrapping effect when the flail slows down and the centrifugal force tending to cause the flail to unwrap decreases.

A preferred embodiment of the invention is shown in the accompanying drawings in which:

FIGURE 1 is a section through a silo equipped with our invention looking down on the unloader;

FIGURE 2 is a vertical section taken on the line 2—2 of FIGURE 1;

Figure 3:
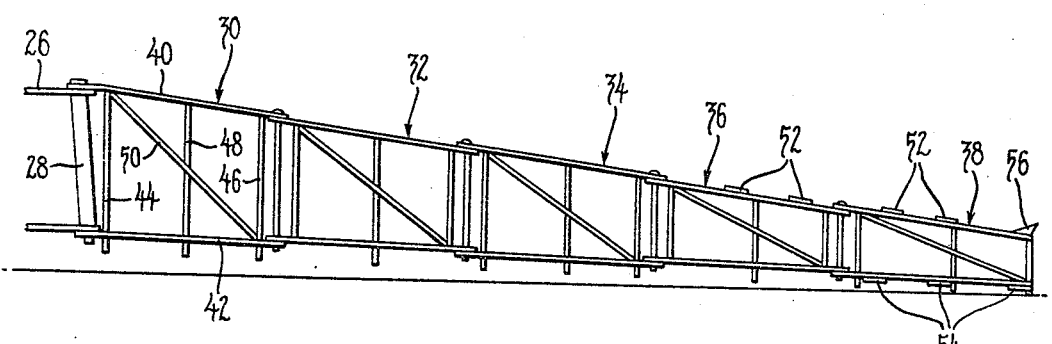
FIGURE 3 is an enlarged elevational view showing details of the flail construction.

Referring now to FIGURES 1 and 2, the invention is shown in a silo 10 which may be of any suitable construction and which includes a floor or bottom portion 12. A slot or aperture 14 in the floor 12 opens into a hollow portion 15 beneath the floor. An endless conveyor 16 extends across the length of the aperture 14 and leads out and up outside the silo into a housing 18. The conveyor 16, which may be of any suitable type, but which is shown as a chain and slat type, is driven by any suitable means such as electric motor 20.

The main unloader structure, which is generally designated as A, includes a central wheel-like cylindrical portion 22 adapted to be rotated by a shaft 24 which extends through the silo bottom 12 and is driven through any suitable drive means C by a motor and transmission unit B.

Secured to the wheel 22, by any suitable means, are a pair of V-shaped flail mounting members 26, one member being secured to the top and the other to the bottom of the wheel 22. The members 26 extend out beyond the periphery of the wheel 22 and together carry a pivot pin 28 which in turn carries the first section of the flail itself. As will be seen in FIGURES 2 and 3, the pivot 28 is inclined from the vertical for the purpose to be described below. The flail itself comprising any suitable number of individual sections that are pivoted together to form a continuous member that is flexible in the horizontal plane of rotation but which is rigid in a vertical direction. In the embodiment shown, there are five sections generally designated 30, 32, 34, 36 and 38. It will be seen from FIGURE 3 that the innermost section 30 has a vertical height twice that of the outermost section 38.

The general construction of each of the flail sections is the same except for certain tooth members that are secured to the outer flail sections. Thus each flail section includes an upper frame member 40 and a lower frame member 42 jointed by vertical members 44 and 46. A center vertical member 48 extends downward from the top member 40 and a strengthening brace member 50 connects opposite corners of the flail section. The vertical members 44, 46 and 48 extend down below the bottom frame member 42 and serve as rake members to move loose silage material along the bottom of the silo into the slot 14.

Figure 4:
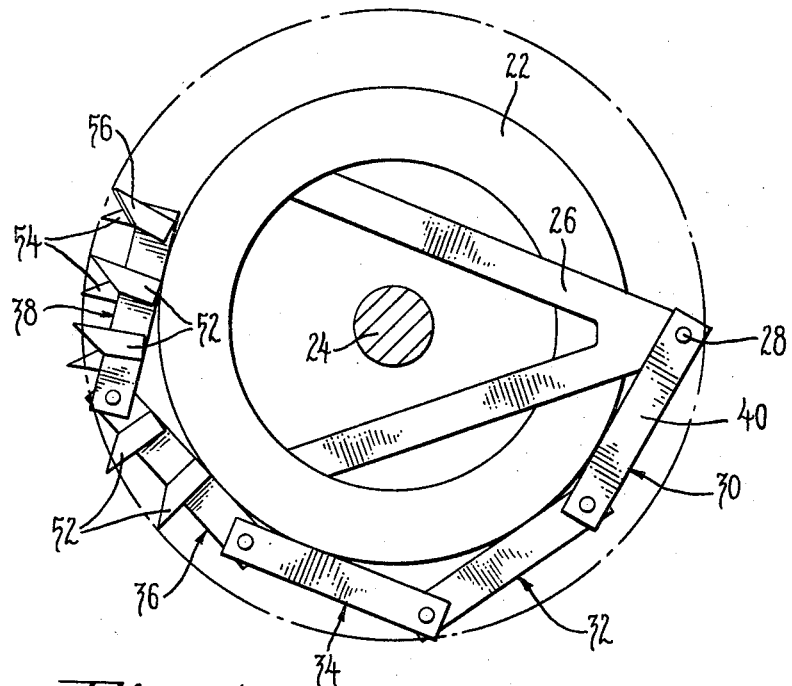
FIGURE 4 is an enlarged view of the flail structure shown in a wrapped position and showing further details thereof.

As seen in FIGURES 3 and 4, the outer two frame sections 36 and 38 have tooth members secured thereto. The flail section 36 has teeth 52 on its top frame member. The outer flail section 38 has similar teeth 52 on its top portion and teeth 54 secured to the bottom frame member. Secured by any suitable means, to the top outer edge of the flail portion 38, is another tooth member 56 which extends upward from the frame member and acts to undercut silage material lying close to the silo wall. This tooth 56 is very important in providing proper cutting action of the silage.

Figure 6:
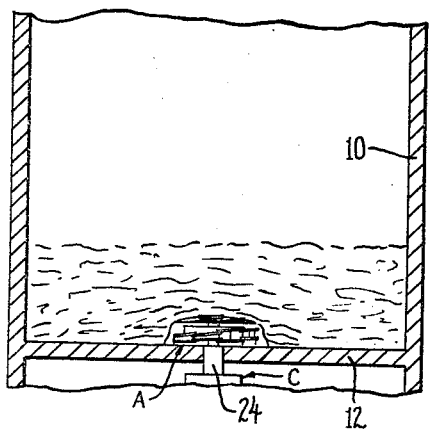
FIGURE 6 illustrates the flail in its initial condition after filling the silo.

When the flail is wrapped around the wheel 22 as shown in FIGURES 4 and 6, the flail is under a hood portion 60 which is of a greater diameter than the wheel 22. A helical or spiral flight 62 is secured to the top of the hood and acts to enable rotation of the unloader even when the silage is tightly packed down in the unloader.

Figure 7:
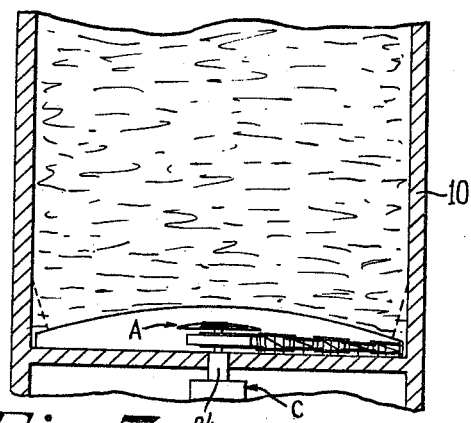
FIGURE 7 is a view similar to FIGURE 6 showing the dome formed in the silage by the silo unloader.

As previously mentioned, the pivot 28 connecting the flail with the driving structure is preferably inclined from the vertical. When the unloader is rotating at a relatively high speed, centrifugal force on the flail members causes the same to extend radially outward as shown in FIGURES 1, 2 and 7. When the power is shut off the unloader immediately begins to slow down and the weight of the flail members causes the same to lag behind and eventually wrap itself around the wheel 22. This action is similar to that of a door having hinges that are not vertical and which always either tends to swing open or swing closed, depending on the direction in which the hinges are inclined. While the inclined pivot feature is not essential it does aid in the self-wrapping effect which causes the unloader to store itself under the hood.

OPERATION

Initially the flail is in its wrapped condition shown in FIGURES 4 and 6. As silage is then fed into the silo by any suitable means from the top thereof, it falls on the hood 60 which is over the flail structure. During the filling operation it is desirable to keep the unloader structure including the hood rotating at a relatively low speed so as to insure that it does not become immobile due to tight packing of the silage. When it is desired to begin unloading the silo, the unloader flail structure is driven at a relatively high speed. The flail or unloader then begins to cut its way outward and a certain amount of silage will fall down and be swept by the flail and the rake teeth thereon into the slot 14. The conveyor 16 operates to carry the silage material falling through the slot 14 outward into the housing 18 from which it can be carried to feed bunks, etc.

As the flail assembly gradually works its way radially outward and the silage material falls into the path of the flail, a dome is formed under the silage. As the flails move further and further outward a smaller cross section of silage acts to support the whole upper mass of material, resulting in an increased density of the supporting silage. The friction force between the silage mass and the walls of the silo plus a given cross sectional area of supporting material together act to hold up the total mass. Eventually the flail will cut outwardly and upwardly into the supporting mass sufficiently so that the whole mass will inch or move downward. The upward extending tooth 56 on the outer flail section acts to undercut the silage much in the manner of a boring tool acts to internally cut into a cylindrical member on a lathe. The height of the dome will vary with different silage material, with different size silos and with other factors, however, it has been found that regardless of the size of the dome the material acts to move downward into the path of the flail at a rate equal to or less than the flail's capacity to move the material into the slot 14.

Figure 5:
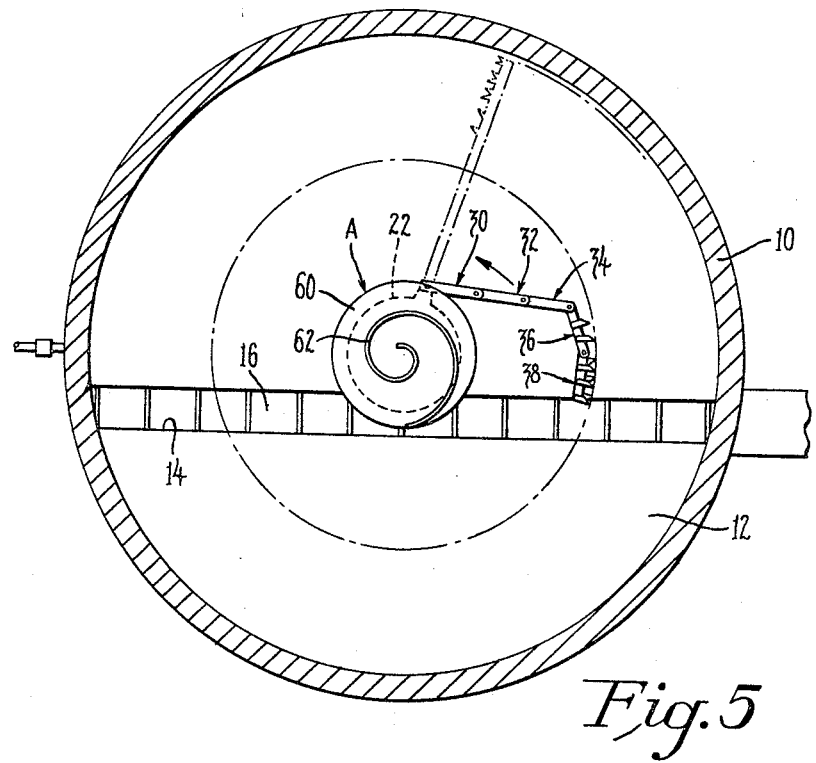
FIGURE 5 is a section view through the silo similar to FIGURE 1 showing the flail in the condition where it is partially unwrapped.

During the initial cutting operation, the teeth 52 and 54 on the outermost flail sections act to cut outwardly into the wall of silage as shown in FIGURE 5. Under some conditions with the unloader being idle for a period of time, ther may be additional settling of the silage material which would require a new cutting action of the flail in order for it to reach its outer operating position. The drag on the flail by the silage material as well as the inclined pivot 28 together insures that the flail will always be in a wrapped condition when the power is turned off so that any settling of silage material cannot interfere with the flail action since the flail will be under the hood 60.

Modifications and changes will be apparent to those skilled in the art and such modifications and changes are deemed to be within the scope of our invention.

What is claimed is:

1. A bottom unloader for circular silos comprising a flail assembly pivotally connected to a drive member centrally located in the bottom of the silo, said flail assembly comprising a plurality of rigid sections pivoted together on substantially vertical axes allowing the assembly to wrap around the drive member and to extend radially outward above the bottom of the silo due to centrifugal force when the drive member is rotated at a relatively high speed, a plurality of teeth extending forwardly in the direction of rotation from the upper portion and the lower portion of at least the outermost rigid section to cut into the silage when the drive member is rotated, rake members attached to at least some of the rigid sections to move the silage which is cut loose by the teeth, the outermost flail section having a toothed member at the upper outer extremity which extends upwardly from said outermost flail section, outwardly from the outermost end of the outermost flail section and forwardly in the direction of rotation of said flail sections so as to cut upward into silage material adjacent to the wall of the silo when all of said rigid sections are extended.

2. The bottom unloader of claim 1 wherein a hood member is carried above the drive member, said hood having a diameter such that substantially all of the flail assembly is under the hood when the flail assembly is wrapped around the drive member.

3. The bottom unloader of claim 2 wherein the hood member has a spiral flight thereon to aid the hood to turn when silage covers the same.

4. The bottom unloader of claim 1 wherein the pivot connection between the drive means and the flail assembly is inclined from the vertical so that the weight of the flail tends to cause it to wrap itself around the drive means.

5. A bottom unloader for circular silos comprising a flail assembly pivotally connected to a drive member centrally located in the bottom of the silo, said flail assembly comprising a plurality of rigid sections pivoted together on substantially vertical axes allowing the assembly to wrap around the drive member and to extend radially outward above the bottom of the silo due to centrifugal force when the drive member is rotated at a relatively high speed, the outermost flail section having a toothed member at the upper outer extremity adapted to cut upward into silage material adjacent to the wall of the silo as it tends to move downward in a mass, a hood member carried above the drive member, said hood having a diameter such that substantially all of the flail assembly is under the hood when the flail assembly is wrapped around the drive member, and wherein the hood member has a spiral flight thereon to aid the hood to turn when silage covers the same.

6. A bottom unloader for circular silos comprising a flail assembly pivotally connected to a drive member centrally located in the bottom of the silo, said flail assembly comprising a plurality of rigid sections pivoted together on substantially vertical axes allowing the assembly to wrap around the drive member and to extend radially outward above the bottom of the silo due to centrifugal force when the drive member is rotated at a relatively high speed, the outermost flail section having a toothed member at the upper outer extremity adapted to cut upward into silage material adjacent to the wall of the silo as it tends to move downward in a mass, and wherein the pivot connection between the drive means and the flail assembly is inclined from the vertical so that the weight of the flail tends to cause it to wrap itself around the drive means.

References Cited

UNITED STATES PATENTS

| 3,035,718 | 5/1962 | Behlen | 214—17 |
| 3,379,323 | 4/1968 | Knutsen | 214—17 |
| 439,773 | 11/1890 | Cole | 222—412 |
| 3,394,824 | 7/1968 | Mast | 214—17 |

FOREIGN PATENTS 101,986  6/1963  Norway.

ROBERT G. SHERIDAN, Primary Examiner

U.S. Cl. X.R.

222—228, 412